(12) United States Patent
Skinner

(10) Patent No.: US 12,279,567 B2
(45) Date of Patent: Apr. 22, 2025

(54) IRRIGATION SYSTEM FOR A VERTICAL GROWTH TOWER

(71) Applicant: INTELLIGENT GROWTH SOLUTIONS LIMITED, St Andrews Fife (GB)

(72) Inventor: Niall Alexander Skinner, St Andrews Fife (GB)

(73) Assignee: INTELLIGENT GROWTH SOLUTIONS LIMITED, St. Andrews Fife (GB)

( * ) Notice: Subject to any disclaimer, the term of this patent is extended or adjusted under 35 U.S.C. 154(b) by 192 days.

(21) Appl. No.: 17/760,140

(22) PCT Filed: Feb. 9, 2021

(86) PCT No.: PCT/GB2021/050292
§ 371 (c)(1),
(2) Date: Aug. 4, 2022

(87) PCT Pub. No.: WO2021/161003
PCT Pub. Date: Aug. 19, 2021

(65) Prior Publication Data
US 2023/0080828 A1    Mar. 16, 2023

(30) Foreign Application Priority Data

Feb. 10, 2020    (GB) ..................................... 2001757

(51) Int. Cl.
*A01G 31/06*    (2006.01)
*A01G 9/24*    (2006.01)

(52) U.S. Cl.
CPC ............. *A01G 31/06* (2013.01); *A01G 9/247* (2013.01)

(58) Field of Classification Search
CPC ............................... A01G 31/06; A01G 9/247
See application file for complete search history.

(56) References Cited

U.S. PATENT DOCUMENTS

| | | | |
|---|---|---|---|
| 10,194,596 B2 * | 2/2019 | Esaki | A01G 9/023 |
| 10,327,399 B2 * | 6/2019 | Elazary | G05D 1/0246 |
| 10,973,186 B2 * | 4/2021 | Blackburn | A01G 9/029 |

(Continued)

FOREIGN PATENT DOCUMENTS

| | | | |
|---|---|---|---|
| CN | 207070710 U | * | 3/2018 |
| CN | 109041945 A | * | 12/2018 |

(Continued)

OTHER PUBLICATIONS

UK IPO Search Report for application No. GB2001757.0, dated Jul. 31, 2020.

(Continued)

*Primary Examiner* — Brady W Frazier
*Assistant Examiner* — Katherine Anne Kloecker
(74) *Attorney, Agent, or Firm* — MOSER TABOADA

(57) ABSTRACT

There is presented an irrigation system for use in a vertical growth tower, the irrigation system comprising a watering head mounted on the lift mechanism of the vertical growth tower such that the lift mechanism is configured to transfer a growth tray from a stack of growth trays from a storage position to a management position and to move the watering head into position to water a growth tray within the vertical growth tower.

19 Claims, 6 Drawing Sheets

(56) References Cited

U.S. PATENT DOCUMENTS

| | | | | |
|---|---|---|---|---|
| 2014/0017043 | A1* | 1/2014 | Hirai | A01G 31/02 |
| | | | | 414/267 |
| 2015/0282437 | A1* | 10/2015 | Ohara | A01G 9/247 |
| | | | | 47/66.6 |
| 2018/0014471 | A1 | 1/2018 | Jensen et al. | |
| 2019/0208717 | A1* | 7/2019 | Christiaens | A01G 31/06 |
| 2023/0276757 | A1* | 9/2023 | Marder-Eppstein | A01G 9/143 |
| | | | | 700/228 |

FOREIGN PATENT DOCUMENTS

| | | |
|---|---|---|
| CN | 111328697 A | 6/2020 |
| DE | 3814203 A1 | 11/1989 |
| EP | 3453252 A1 | 3/2019 |
| GB | 2121263 A | 12/1983 |
| GB | 2516515 A | 1/2015 |
| JP | 2000209970 A | 8/2000 |
| KR | 20200054528 A | 5/2020 |
| WO | WO-2019148736 A1 | 8/2019 |
| WO | WO-2020087151 A1 | 5/2020 |
| WO | WO-2020144269 A1 | 7/2020 |

OTHER PUBLICATIONS

International Search Report and Written Opinion for application No. PCT/GB2021/050292, dated Mar. 5, 2021.

* cited by examiner

IRRIGATION SYSTEM FOR A VERTICAL GROWTH TOWER

FIELD OF THE INVENTION

The system described herein relates to the field of irrigation systems for crops, specifically for irrigation systems for crops grown in vertical farms.

BACKGROUND OF THE INVENTION

Irrigation of vertical farms that comprise stacks of growth trays within which plants are grown presents a number of technical challenges, beyond the selection of the optimum water delivery method to the crop (aeroponics, hydroponics etc.).

Primary of these problems is efficient delivery of water to each individual tray within a given stack of growth trays.

Various methods have been used to provide 'cascade' irrigation of a number of trays, where irrigation water is provided to a top level tray and is then drained from this tray to the tray below and so on until the lowest tray is irrigated. This method of irrigation is efficient in terms of being simple and only requires watering equipment to be provided at the top level with a drain provided below the bottom level. However, the flow of water between trays introduces the chance of disease or contamination being spread between levels. Furthermore, such a method of irrigation cannot guarantee a uniform amount of water and/or nutrient being delivered to the crops in each tray.

Cascade methods of irrigation are also only appropriate for a monoculture environment, where the crops grown in each tray are the same and therefore require substantially the same nutrient and watering frequency. Cascade methods of irrigation also require large powers and volumes of stored water to irrigate a stack of trays in vertical farm effectively, as enough water must be available to irrigate an entire stack of crop at once.

A common alternative method of irrigation to the cascade approach is to recover each tray individually to a fixed location away from the stacks of trays where watering is carried out. This allows individual control of irrigation and nutrient but is very power and time hungry due to the number of machine movements required to water an entire stack, and the fact that trays are being moved at their heaviest point, when full of water or fully wet growing substrate.

SUMMARY OF THE INVENTION

According to a first aspect there is provided an irrigation system for use with vertical growth towers that comprise a lift mechanism and at least one stack of growth trays, the at least one stack of growth trays comprising a plurality of growth trays, the irrigation system comprising:

- a watering head configured to deliver water from a reservoir to a growth tray within the plurality of growth trays in a vertical growth tower, the watering head being mounted onto the lift mechanism of the vertical growth tower such that during use the watering head is lifted by the lift mechanism to a growth tray and water is delivered by the watering head to the growth tray.

During use of the irrigation system water maybe delivered to one or more growth trays within the at least one stack of growth trays directly. As a result, the volume of water delivered to each tray within the plurality of trays may be specifically tailored to the plants being grown within that growth tray, for example.

Furthermore, the growth trays are retained in position within the at least one stack of growth trays without being required to be moved by the lift mechanism to a growth tray management position where water may be delivered to the growth tray. Therefore, the irrigation system of the present aspect allows bespoke delivery of water to growth trays within at least one stack of growth trays in more efficient manner than systems that require growth trays to be positioned at a remote location outside of the growth tower for watering.

Another advantage of the irrigation system of the present aspect is that each growth tray within the at least one stack of growth trays can be watered at the most suitable time for the plants growing within that growth tray without the requirements of the plants in other growth trays within the vertical growth farm having to be considered. Therefore, each growth tray within a stack of growth trays can be watered at a different time to the other growth trays, thereby requiring a reduced volume of water being required to be retained within the reservoir at a given time.

This contrast with irrigations systems known in the art that deliver water to the growth tray at the top of a stack and rely on that water filtering down between successive growth trays within the stack, where contamination between growth trays can be promoted by the filtering down of water between growth trays. Furthermore, such "filter down" irrigation systems make it difficult to determine the volume of water delivered and absorbed by a given growth tray, and require all trays within the stack of growth trays to be watered at the same time.

Accordingly, the irrigation system of the current aspect requires reduced power consumption and requires reduced volumes of water to be stored compared to "filter down" systems where water is fed into the top growth tray of a stack and allowed to flow down between trays.

The reservoir may be connected to the watering head by a hose.

The reservoir may be located on or adjacent to the lift mechanism. Alternatively, the reservoir may be located remotely from the lift mechanism. In embodiments where the reservoir is located remotely, the reservoir may be located in a convenient location, both structurally for the installation within which the vertical growth tower is located and for access to carry out any required maintenance separately from that carried out for the vertical growth tower itself. Further, the remote location of the reservoir minimises the weight required to be supported by the lift mechanism, thereby reducing the specifications of the lifting mechanism to that required to support and move a growth tray.

Typically, the reservoir retains a volume of water. The water retained by the reservoir may be purified water. The water retained by the reservoir may be distilled water. The water retained by the reservoir may be rain water. The water retained by the reservoir may comprise an additive composition. The additive composition may comprise nutrients such as minerals, for example. The nutrients may promote plant growth generally. The nutrients may promote growth of a specific plant that is being grown in one or more growth trays within the vertical growth tower.

The irrigation system may comprise a plurality of reservoirs. Each reservoir within the plurality of reservoirs may retain water comprising different additive compositions. Accordingly, during use the irrigation system may be configured to switch between each reservoir within the plurality of reservoirs to deliver water with the correct additive composition (or lack thereof) to a given growth tray within the vertical growth farm.

The or each reservoir may comprise a pump configured to pump water from a reservoir to the watering head. The pump may be configured to generate pressure in the water in the watering head. The irrigation system may comprise at least one one-way valve configured to maintain the pressure of the water between the reservoir and the watering head.

Typically, the watering head is separated from the growth trays within a stack of growth trays by a space. Preferably, the watering head does not come into contact with a growth tray during delivery of water from the watering head to the growth tray. Accordingly, the watering head may be moved on the lift mechanism freely between growth trays without requiring extension or retraction of the watering head to or from the growth tray. Therefore, the irrigation system of the present aspect may not require any moving parts in addition to the lift mechanism of the vertical growth tower within which the irrigation system may be installed.

Accordingly, the lack of additional moving parts other than required lift mechanism for growth trays minimises energy consumption and the potential for mechanical failure and the requirement for the associated maintenance.

In embodiments, the watering head may comprise a valve. The valve may be configured to control the flow of water through the watering head. Accordingly, the valve may be closed and is opened only when water is to be delivered from the watering head to a growth tray. The valve may be closed when the watering head is not located adjacent or next to a growth tray. Accordingly, when the watering head is located between growth trays in a stack of growth trays the valve may be closed and water is not delivered from the watering head. When the watering head is correctly positioned adjacent to a growth tray, the valve may open and water may be delivered from the watering head to the growth tray.

The valve may be a solenoid valve.

The valve may be a pressure valve. The valve may open when the pressure of the water with in the watering head is determined to be at or to have exceeded a pre-defined threshold pressure. The watering head may further comprise a pressure sensor and the valve may open when the pressure of the water within the watering head is detected by pressure sensor to be at or to have exceeded a pre-defined threshold pressure. The pre-defined threshold pressure may be a minimum pressure that is required to ensure that the water is projected from the watering head to the growth tray with minimum water wastage. For example, in embodiments where there is a space between the watering head and growth tray during water delivery, the threshold pressure may be the minimum pressure at which substantially all water projected from the watering head is delivered to the adjacent growth tray, and a minimum volume of water drops through the space and is wasted. Furthermore, as substantially all water projected by the watering head is received by the intended growth tray the volume of water delivered by the irrigation system may be accurately metered and, where relevant accurate metering of nutrients delivered per growth tray.

Accordingly, the pre-defined threshold pressure is determined by at least one of the specific distance between the watering head and the growth tray, the orientation of the watering head with respect to the growth tray and the relative height of the watering head compared to the growth tray.

In some embodiments the irrigation system may comprise a controller. The controller may be configured to control the water delivery process. The controller may work independently of or in conjunction with the lift mechanism control system.

The irrigation system of the present aspect may be configured such that during use the lift mechanism upon which the watering head is mounted may move to a first position such that the watering head may be adjacent to a growth tray to be watered. Once the watering head is in position, the watering head may project water to the growth tray until a predetermined volume of water has been delivered. After the predetermined volume of water has been delivered the watering head ceases projecting water to the growth tray and the lift mechanism may move to a second position such that the watering head may be adjacent to a second growth tray, and the watering process is repeated.

In a second aspect there is presented a method of using an irrigation system according to the first aspect, the method comprising the steps:
  a) moving the lift mechanism such that the watering head of the lift mechanism is adjacent to a growth tray within the plurality of growth trays;
  b) projecting water from the watering head into the growth tray; and optionally
  c) repeating steps a) and b) until each growth tray within the plurality of growth trays that requires water has been irrigated by the irrigation system.

In some embodiments, the method may be repeated until each tray within a vertical growth tower have been watered.

In some embodiments, the method may be repeated until a subset or group of growth trays within the plurality of growth trays within a stack of growth trays have been irrigated.

In some embodiments, the method may be carried out to water or irrigate a single growth tray.

In embodiments where multiple growth trays are to be watered or irrigated, there may be a delay after a first growth tray has been irrigated. The lift mechanism may move such that the watering head is adjacent to a second growth tray after the first growth tray has been watered or irrigated, and there may be a delay before the watering head projects water to the adjacent growth tray. The lift mechanism may remain adjacent to the first growth tray for a period of time after water has been projected to the first growth tray before moving to a position such that the watering head is adjacent to a second growth tray.

The period of time between the step of projecting water from the watering head to a first growth tray and the step of projecting water from the watering head to a second growth tray may be from 1 minute to 7 days. The period of time may be from 1 minute to 1 day. The period of time may be from 1 minute to 60 minutes. The period of time may be from 1 hour to 24 hours. The period of time may be from 1 hour and 12 hours.

During a watering period, the method may be carried out such that a different growth tray is watered at least once every 5 minutes, 10 minutes, 15 minutes, 20 minutes, 25 minutes or 30 minutes or a value there between. Accordingly, the watering head may be moved between growth trays such that a different growth tray is adjacent to the watering head at least every 5 minutes, 10 minutes, 15 minutes, 20 minutes, 25 minutes or 30 minutes or a value there between.

For example, the method may be carried out during a watering period such that a different growth tray is watered at least once every 10 minutes, 15 minutes or 20 minutes or a value therebetween.

In embodiments where the watering head comprises a valve, water may be projected from the watering head into the growth tray after the pressure of water provided to the watering head has reached or exceeded a predetermined threshold pressure.

The predetermined threshold pressure may be a water pressure that is sufficiently high such that water is projected across a gap between the watering head to the growth tray with minimal water loss.

The predetermined pressure may be 100 kPa (1 bar) to 300 kPa (3 bar). The predetermined pressure may be 100 kPa (1 bar) to 200 kPa (2 bar). The predetermined pressure may be 200 kPa (2 bar) to 300 kPa (3 bar). For example, the predetermined pressure may be 100 kPa, 150 kPa, 200 kPa, 250 kPa or 300 kPa or values therebetween.

According to a third aspect, there is provided a vertical growth tower comprising at least one stack of growth trays and a lift mechanism configured to mechanically transfer growth trays from the at least one stack of growth trays between a management position and a storage position, wherein the at least one stack of growth trays comprises a plurality of growth trays, wherein the lift mechanism comprises an irrigation system according to the first aspect.

Each growth tray within the plurality of growth trays may comprise a receiving member configured to receive water from the watering head. Each growth tray within the plurality of growth trays may comprise a plurality of receiving members. Each growth tray within the plurality of growth trays may comprise two, three or four receiving members. For example, each growth tray within the plurality of growth trays may comprise two receiving members, Accordingly, during use water may be projected from the watering head into the receiving member of the growth tray that is adjacent to the watering head.

In some embodiments, during use water may be projected from the watering head across a gap or space into the receiving member of the growth tray adjacent to the watering head.

The or each receiving member may comprise a tubular element. The tubular element may extend along substantially the length of the growth tray. The tubular element may extend along substantially the width of the growth tray.

Alternatively, the tubular element may extend along a portion of the length of the growth tray. The tubular element may extend along a portion of the width of the growth tray. The tubular element may extend along approximately 40%, 50% or 60% of the length of the growth tray. The tubular element may extend along approximately 40%, 50% or 60% of the width of the growth tray. For example, the tubular element may extend along approximately 50% of the width of the growth tray.

The or each receiving member may comprise one or more apertures configured to allow water received by the or each receiving member to be transferred to the growth tray. The or each receiving member may comprise an aperture at an end of the receiving member opposed to the end of the receiving member that receives water from the watering head. In embodiments comprising a tubular element, the tubular element may comprise a plurality of apertures. The plurality of apertures may extend along the length of the tubular element. Accordingly, the tubular element may distribute water received from the watering head along the length of the growth tray. The diameter of each aperture within the plurality of apertures may be the same. The diameter of each aperture within the plurality of apertures may vary along the length of the tubular element. The diameter of each aperture within the plurality of apertures may increase along the length of the tubular element from the point at which water is initially received from the watering head by the receiving member.

The or each receiving member may comprise a baffle element. Water received from the watering head at least partially impact the baffle element and the baffle element may regulate the flow water along the receiving member. The baffle element may minimise or prevent water received by the receiving member splashing onto the leaves of plants growing within the growth tray. In embodiments where the or each receiving member comprises a tubular element, the tubular element may comprise a bend that corresponds to a baffle element. Accordingly, the tubular element may comprise a first tubular portion and a second tubular portion connected by the bend. The tubular element may comprise a first tubular portion connected to the bend.

The vertical growth tower may comprise two stacks of growth trays and the lift mechanism may be located between the two stacks of growth trays. The lift mechanism may comprise a first watering head facing a first stack of growth trays. During use the first watering head may be configured to deliver water to a growth tray in the first stack of growth trays. The lift mechanism may comprise a second watering head facing a second stack of growth trays. During use the second watering head may be configured to deliver water to the corresponding growth tray in the second stack of growth trays.

The first watering head and the second watering head may be coupled with a connecting member. The connecting member may comprise an inlet that is connected to a reservoir by a hose. Accordingly, water may be transferred from the reservoir to the first watering head and the second watering head via the hose and connecting member.

The vertical growth tower may comprise a plurality of stacks of growth trays. The plurality of stacks of growth trays may comprise multiple pairs of stacks of growth trays, where each pair of stacks of growth trays comprises a first stack of growth trays and a second stack of growth trays. The vertical growth tower may comprise a lift mechanism that is configured to transfer a growth tray from the first stack of growth trays from a storage position to a management position and to transfer a growth tray from the second stack of growth trays from a storage position to a management position. The vertical growth tower may comprise a lift mechanism that is configured to transfer a growth tray from a stack of growth trays of any one of the plurality of stacks of growth trays from a storage position to a management position. The vertical growth tower may comprise a single lift mechanism that is configured to transfer a growth tray from a stack of growth trays of any one of the plurality of stacks of growth trays from a storage position to a management position. The management position may be located within the vertical growth tower. The management position may be located outside of the vertical growth tower.

The or each lifting mechanism may comprise a first watering head. The or each lifting mechanism may comprise a second watering head. Accordingly, the irrigation system may be configured to irrigate or water each growth tray within the vertical growth tower.

BRIEF DESCRIPTION OF THE FIGURES

Embodiments of the present invention will now be described, by way of non-limiting example, with reference to the accompanying drawings.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Figure 1:
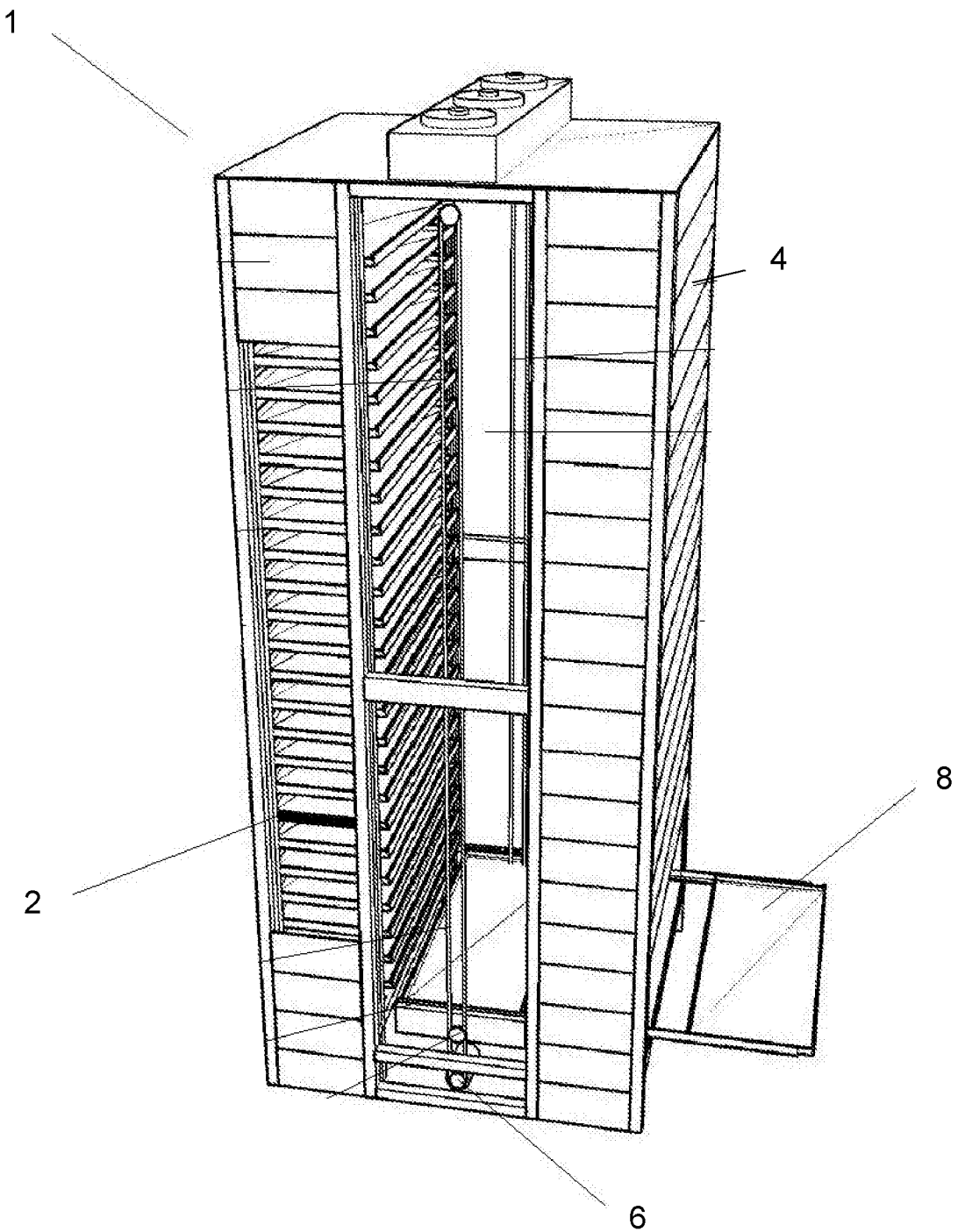
FIG. 1: a perspective view of a vertical growth tower.

The irrigation system as described herein is configured to be used in a vertical growth tower as shown in FIG. 1, for example. An example vertical growth tower 1 comprises a first stack of growth trays 2 and a second stack of growth trays 4, a lift mechanism 6, and a management position 8. The first stack of growth trays 2 comprises a plurality of growth trays and each growth tray 8 is stored in a storage position within the first stack of growth trays 2. The second stack of growth trays 4 comprises a plurality of growth trays and each growth tray is stored in a storage position within the second stack of growth trays 4. A given growth tray may be moved using the lift mechanism 6 between a storage position and the management position 8.

Figure 2:
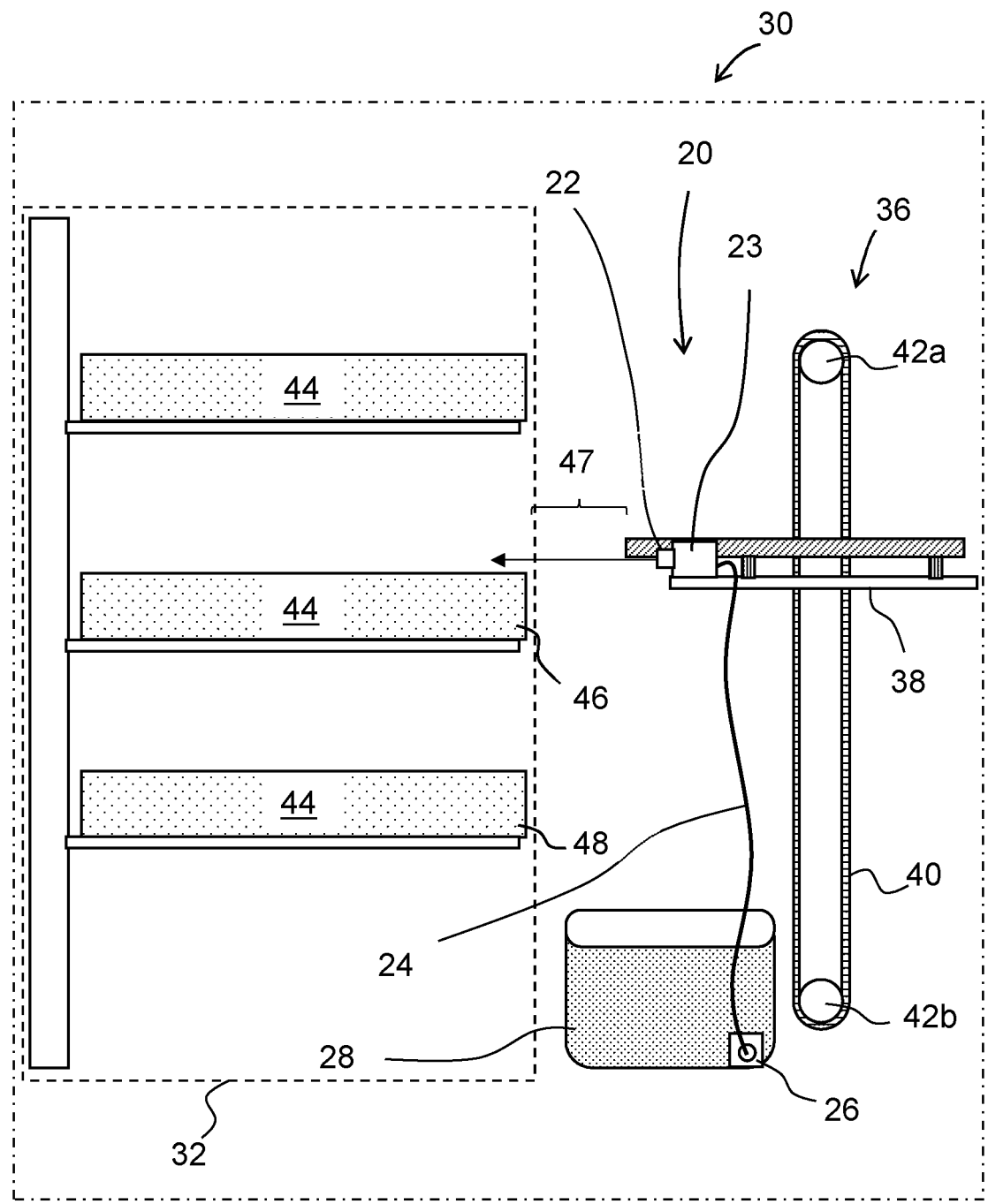
FIG. 2: a side view of an irrigation system installed in the lift mechanism of a vertical growth tower according to an embodiment.

With reference to FIG. 2, an irrigation system 20 comprises a watering head 22, a hose 24, a pump 26 and a reservoir 28. The watering head 22 comprises a pressure valve 23 and is connected to the reservoir 28 by the hose 24 such that water can be pumped from the reservoir 28 by the pump 26 to the watering head 22. The irrigation system 20 is installed within a vertical growth tower 30. The vertical growth tower 30 comprises a first stack of growth trays 32 and a second stack of growth trays (not shown) with a lift mechanism 36 positioned in between the first stack of growth trays 32 and the second stack of growth trays. The lift mechanism 36 comprises a support 38, a belt 40 and pulleys 42a and 42b. The watering head 22 is mounted onto the support 38 of the lift mechanism 36 and is oriented toward the growth trays 44 of the first stack of growth trays 30.

The lift mechanism 36 is configured to move the watering head 22 up and down the vertical tower 30 so that the watering head 22 is moves between the growth trays 44 of the first stack of growth trays 32.

During use, the primary function of the lift mechanism 36 is to move a growth tray 34 between a management position and a storage position. The lift mechanism 36 has a secondary function of moving the watering head 22 to a first watering position where the watering head 22 is located adjacent to a first growth tray 46 to be irrigated. Water is pumped to the watering head 22 from the reservoir 28 by the pump 26. Once the pressure within the watering head 22 reaches a threshold pressure, the pressure valve 23 of the watering head 22 opens and water is projected from the watering head 22 to the first growth tray 46 across the space 47 between the first growth tray 46 and the watering head 22. The threshold pressure is determined such that substantially all of the water projected from the watering head is received into the first growth tray 46 and the volume of water that drops through the space 47 is at least minimised. Once the required volume of water has been delivered to the first growth tray 46, the pressure valve 23 closes and the lift mechanism 36 moves to a second watering position where the watering head 22 is located adjacent to a second growth tray 48 to be irrigated.

Accordingly, the lift mechanism 36 doubles as both the mechanism that transfers growth trays 34 from a storage position to a management position, and the mechanism that moves the watering head 22 between watering or irrigation positions.

Figure 3:
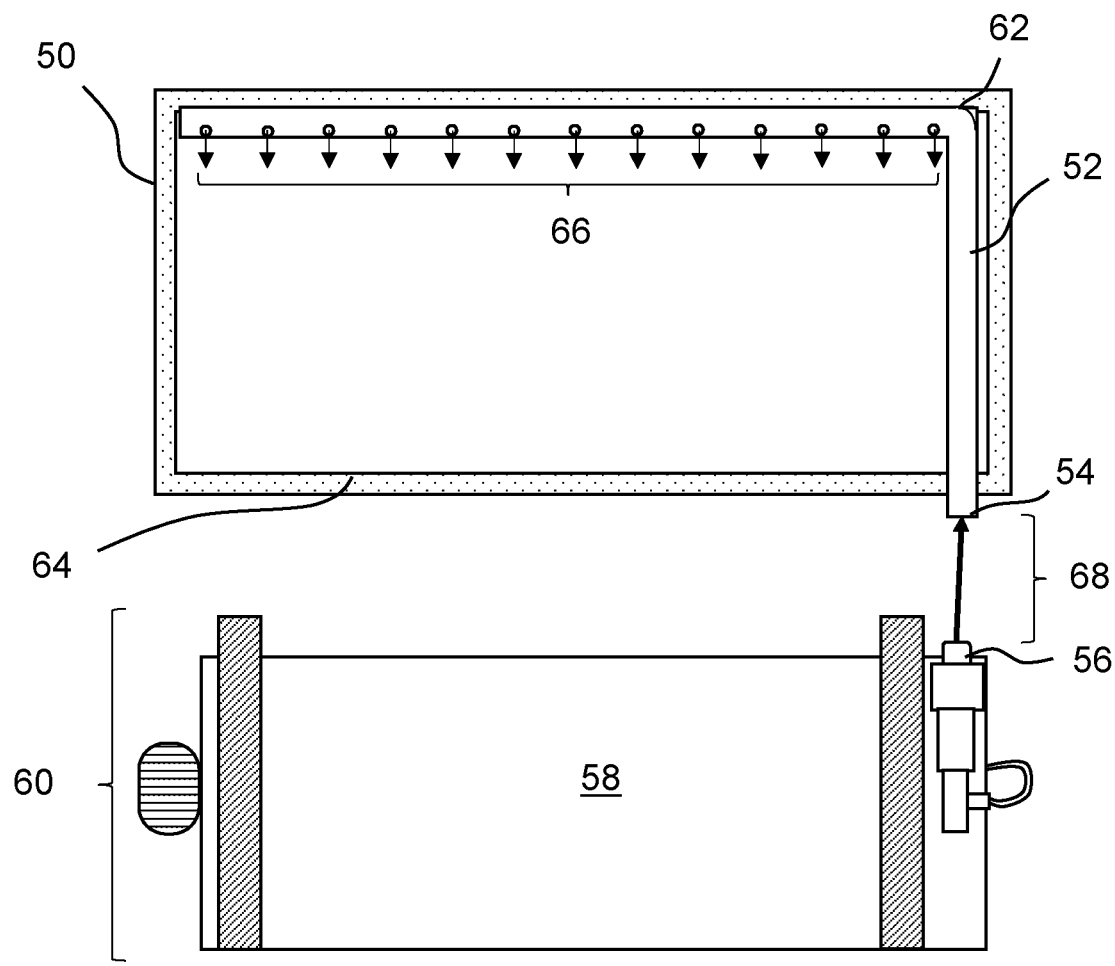
FIG. 3: a schematic top view of an irrigation system irrigating a growth tray according to an embodiment.

With reference to FIG. 3, a growth tray 50 comprises a water receiving element 52. The water receiving element 52 comprises an opening 54 (acting as a first tubular portion) that is located in a position opposed to the watering head 56 mounted on the support 58 of the lift mechanism 60. The water receiving element 52 further comprises a bend 62 (acting as a baffle element) located between an elongate tubular portion 64 (acting as a second tubular portion) and the opening 54. The elongate tubular portion 64 comprises a plurality of apertures 66 positioned along the length of the elongate tubular portion 64.

During use, water is projected from the watering head 56 across the space 68 between the watering head 56 and the watering receiving element 52 as described above and received into the opening 54 of the watering receiving element 52. The water impacts the bend 62 and is directed down the elongate tubular portion 64 and out of each aperture in the plurality of apertures 66 to evenly distribute the water along the length of the growth tray.

Figure 4:
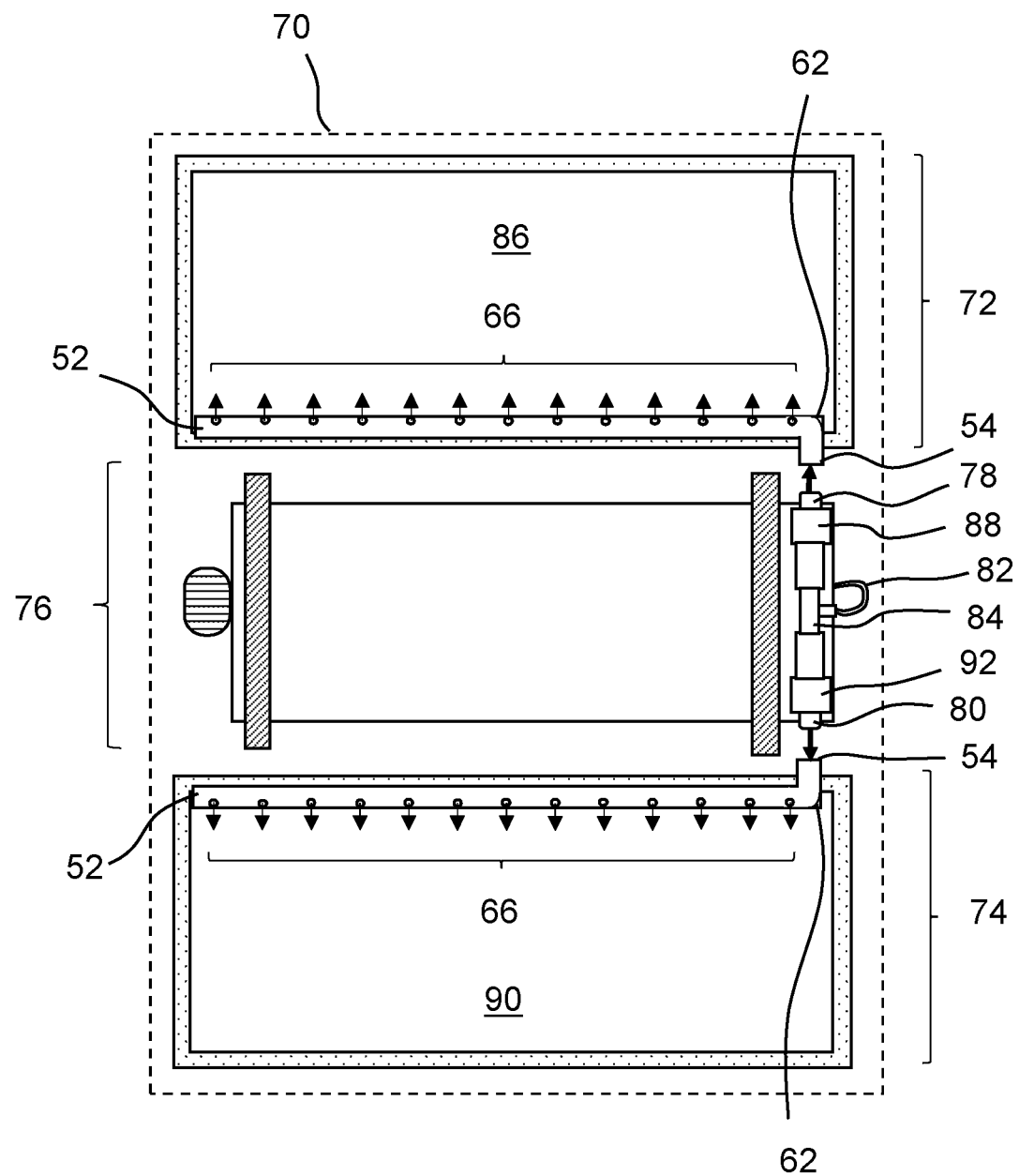
FIG. 4: a schematic top view of an irrigation system irrigating a first growth tray and a second growth tray according to an embodiment.

With reference to FIG. 4, a vertical growth tower 70 comprises a first stack of growth trays 72, a second stack of growth trays 74 and a lift mechanism 76 located in between the first stack of growth trays 72 and the second stack of growth trays 74.

Each growth tray within the first stack of growth trays 72 and the second stack of growth trays 74 comprises a watering receiving element 52 as described above. The lift mechanism 76 comprises a first watering head 78 oriented to project water to the opening 54 of the water receiving element 52 of a growth tray in the first stack of growth trays 72, and a second watering head 80 oriented to project water to the opening 54 of the water receiving element 52 of a growth tray in the second stack of growth trays 74. A hose 82 is connected to a common coupling element 84 that connects to the first watering head 78 and the second watering head 80. The hose 82 thereby connects the first watering head 78 and the second watering head 80 to a remote reservoir (not shown).

During use, the lift mechanism 76 moves to a first position. The first watering head 78 is located opposed to the water receiving element 52 of a growth tray 86 in the first stack of growth trays 72. The water pressure within the first watering head 78 is increased until the pressure reaches or exceeds a threshold pressure. The pressure valve 88 of the first watering head 78 is opened and water is projected from the first watering head 78 into the water receiving element 52 of the growth tray 86. Water then passes around the bend 62 of the water receiving element 52 and is distributed along the length of the growth tray 86 through the apertures in the plurality of apertures 66.

In the first position, the second watering head 80 is located opposed to the water receiving element 52 of a growth tray 90 in the second stack of growth trays 74. If plants growing in the growth tray 90 in the second stack of growth trays 74 also require watering, the water pressure within the second watering head 80 is increased until the pressure reaches or exceeds the threshold pressure. The pressure valve 92 of the second watering head 80 is opened and water is projected from the second watering head 80 into the water receiving element 52 of the growth tray 90. Water then passes around the bend 62 of the water receiving element 52 and is distributed along the length of the growth tray 90 through the apertures in the plurality of apertures 66.

The lift mechanism 76 then moves to a second position and the method repeats as described above for the first position.

Figure 5:
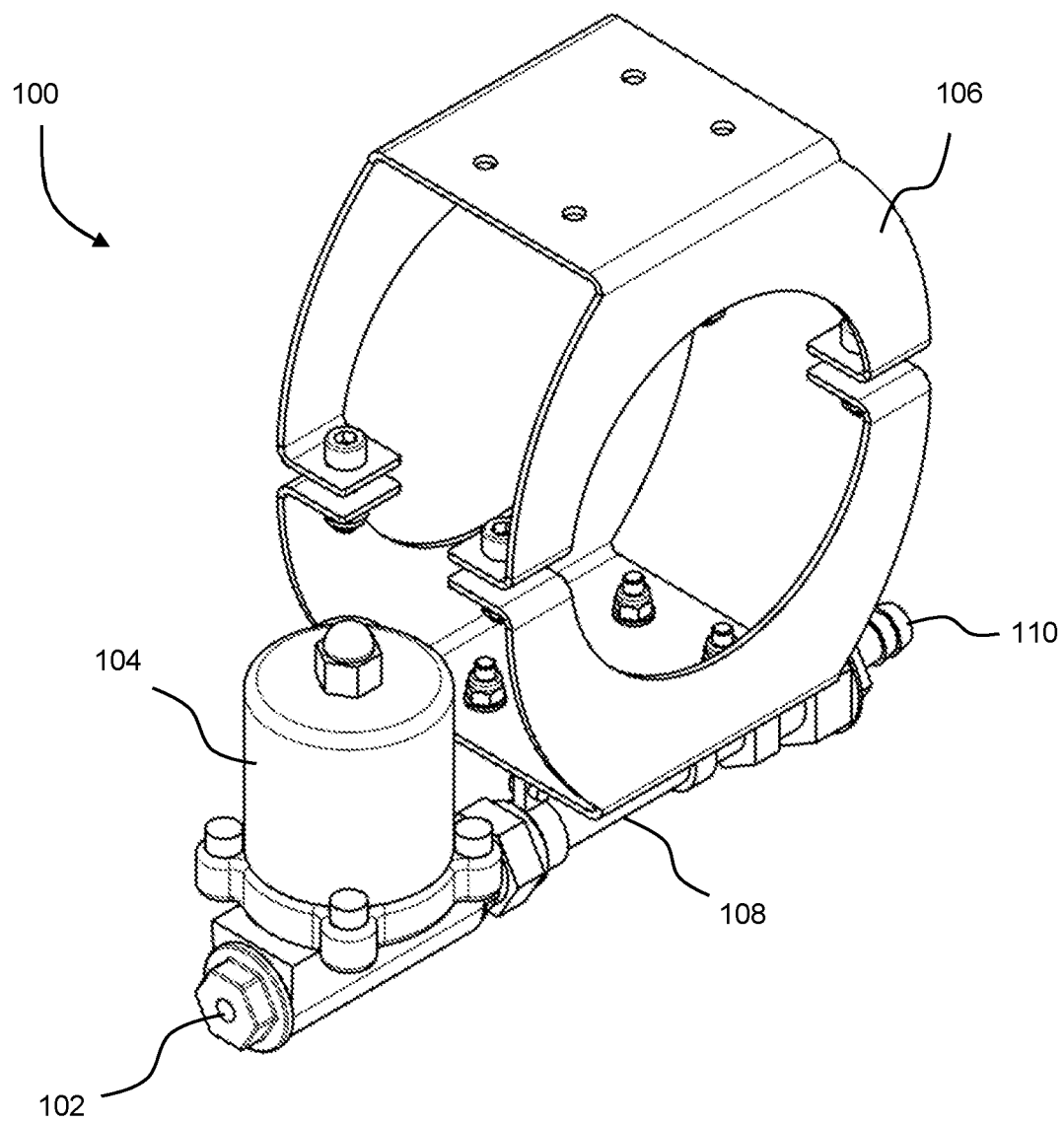
FIG. 5: a perspective view of a watering head according to an embodiment.

With reference to FIG. 5, an irrigation system 100 comprises a nozzle 102 (acting as a watering head), a solenoid valve 104 (acting as a valve), a bracket 106, a body 108, and a hose connector 110. The solenoid valve 104 is configured to control the flow of water through the nozzle 102. The body 108 extends between the hose connector 110 and the nozzle 102 such that during use water may flow from a remote reservoir through a hose connected to the hose connector 110 out of the nozzle 102 through the body 108. The bracket 106 is configured to securely attach the irrigation system to a lift mechanism of a vertical growth farm as described above.

Figure 6:
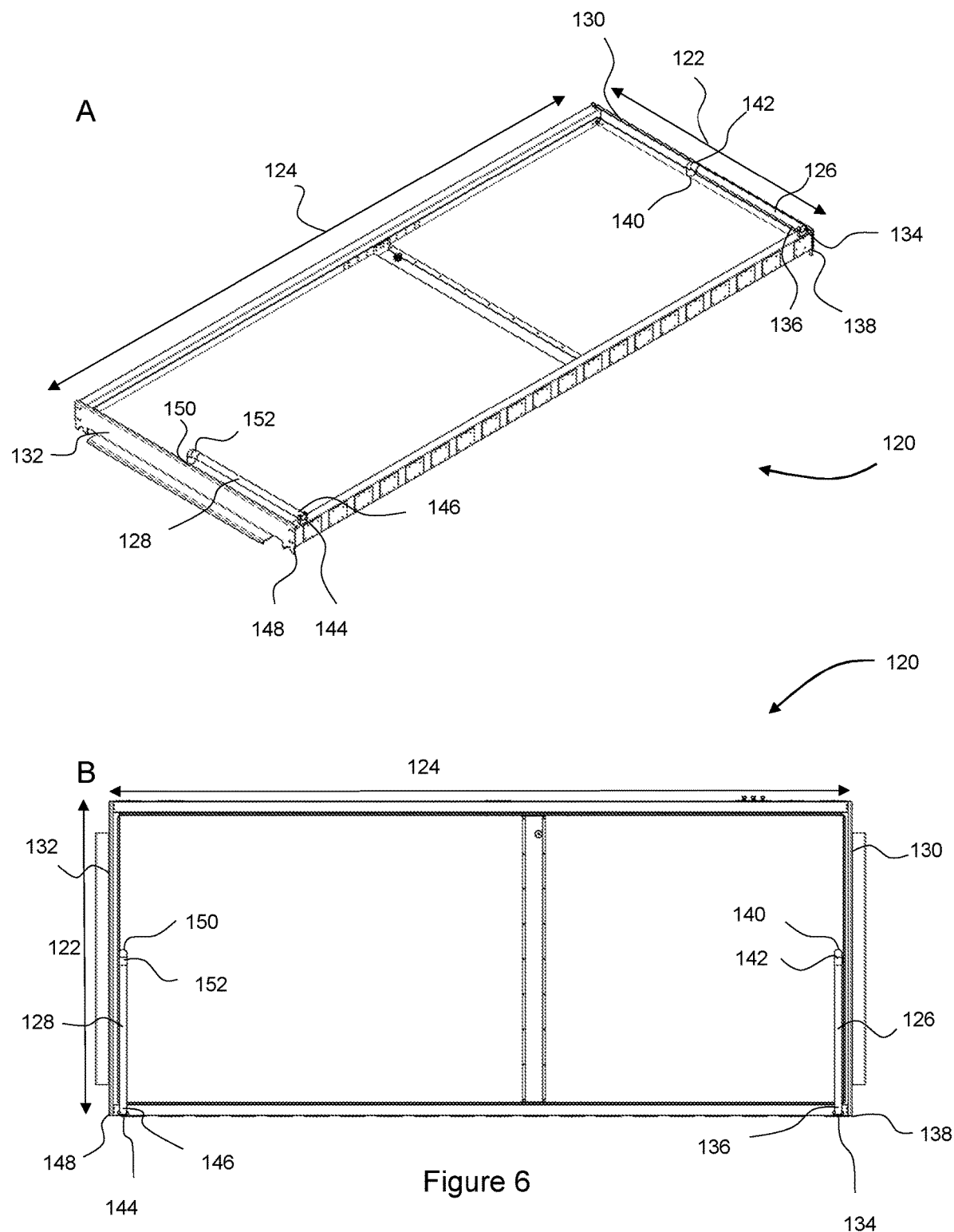
FIG. 6: A) a perspective view and B) a plan view of a growth tray used in a vertical growth tower according to an embodiment.

With reference to FIG. 6, a growth tray 120 has a width 122 and a length 124 and comprises a first receiving member 126 and a second receiving member 128. The first receiving member 126 extends along approximately half of the width 122 of the growth tray 120 at a first side 130 of the growth tray 120. The second receiving member 128 extends along approximately half of the width 122 of the growth tray 120 at a second side 132 of the growth tray 120.

The first receiving member 126 comprises a first opening 134 at a first end 136 adjacent to a corner 138 of the growth tray 120 and a second opening 140 at an opposed second end adjacent to the middle of the first side 130 of the growth tray 120. The first receiving member 126 further comprises a bend 142 (acting as a baffle element) adjacent to the second end of the first receiving member 126.

The second receiving member 128 comprises a first opening 144 at a first end 146 adjacent to a corner 148 of the growth tray 120 and a second opening 150 at an opposed second end adjacent to the middle of the second side 132 of the growth tray 120. The second receiving member 128 further comprises a bend 152 (acting as a baffle element) adjacent to the second end of the second receiving member 128.

During use, water is received from a first watering head of an irrigation system into the first opening 134 of the first receiving member 126, runs along the length of the first receiving member 126, impacts the bend 142 and is redirected into the growth tray 120 to thereby water plants growing in the growth tray 120. Similarly, water is received from a second watering head of an irrigation system into the first opening 144 of the second receiving member 128, runs along the length of the second receiving member 128, impacts the bend 152 and is redirected into the growth tray 120 to thereby further water plants growing in the growth tray 120.

While there has been hereinbefore described approved embodiments of the present invention, it will be readily apparent that many and various changes and modifications in form, design, structure and arrangement of parts may be made for other embodiments without departing from the invention and it will be understood that all such changes and modifications are contemplated as embodiments as a part of the present invention as defined in the appended claims.

The invention claimed is:

1. An irrigation system for use with vertical growth towers that comprise a lift mechanism and at least one stack of growth trays, the at least one stack of growth trays comprising a plurality of growth trays, the irrigation system comprising:
   a watering head configured to deliver water horizontally from a reservoir directly to a growth tray within the at least one stack of growth trays in a vertical growth tower such that the growth trays are retained in position within the at least one stack of growth trays and are irrigated without being required to be moved by the lift mechanism, the watering head being mounted onto the lift mechanism of the vertical growth tower such that during use the watering head is lifted by the lift mechanism to a growth tray within the at least one stack of growth trays and water is delivered by the watering head to a receiving member of the growth tray, wherein the receiving member includes a tubular element having an inlet spaced from the watering head,
   wherein the lift mechanism is configured to mechanically transfer growth trays from the at least one stack of growth trays between a management position and a storage position.

2. The irrigation system according to claim 1, wherein the reservoir is connected to the watering head by a hose.

3. The irrigation system according to claim 1, wherein the reservoir is located remotely from the lift mechanism.

4. The irrigation system according to claim 1, wherein in situ within a vertical growth tower the watering head is separated from the growth trays within the at least one stack of growth trays by a space.

5. The irrigation system according to claim 1, the watering head comprises a pressure valve.

6. A method of using an irrigation system according to claim 1, the method comprising:
   a) moving the lift mechanism such that the watering head of the lift mechanism is adjacent to a growth tray within the at least one stack of growth trays;
   b) projecting water from the watering head into the growth tray; and optionally
   c) repeating steps a) and b) until each growth tray within the at least one stack of growth trays that requires water has been irrigated by the irrigation system,
      wherein the lift mechanism is configured to mechanically transfer growth trays from the at least one stack of growth trays between a management position and a storage position, wherein the lift mechanism comprises the irrigation system according to claim 1.

7. The method according to claim 6, wherein the method is repeated until each tray within a vertical growth tower have been watered, or until a subset or group of growth trays within the at least one stack of growth trays have been watered.

8. The method according to claim 7, wherein there is a delay after a first growth tray has been irrigated.

9. The method according to claim 6 where the watering head comprises a pressure valve, water is projected from the watering head into the growth tray after the pressure of water provided to the watering head has reached or exceeded a predetermined threshold pressure.

10. The method according to claim 9, wherein the predetermined pressure is selected from 100 kPa to 300 kPa.

11. A vertical growth tower comprising at least one stack of growth trays and a lift mechanism configured to mechanically transfer growth trays from the at least one stack of growth trays between a management position and a storage position, wherein the at least one stack of growth trays comprises a plurality of growth trays, wherein the lift mechanism comprises an irrigation system comprising:

a watering head configured to deliver water horizontally from a reservoir directly to a growth tray within the at least one stack of growth trays in the vertical growth tower such that the growth trays are retained in position within the at least one stack of growth trays and are irrigated without being required to be moved by the lift mechanism, the watering head being mounted onto the lift mechanism of the vertical growth tower such that during use the watering head is lifted by the lift mechanism to a growth tray within the at least one stack of growth trays and water is delivered by the watering head to a receiving member of the growth tray, wherein the receiving member includes a tubular element having an inlet spaced from the watering head.

12. The vertical growth tower according to claim 11, wherein each growth tray within the plurality of growth trays includes the receiving member.

13. The vertical growth tower according to claim 11, wherein the receiving member comprises a plurality of apertures.

14. The vertical growth tower according to claim 13, wherein the diameter of each aperture within the plurality of apertures varies along the length of the tubular element.

15. The vertical growth tower according to claim 11, wherein the vertical growth tower comprises two stacks of growth trays and the lift mechanism is located between the two stacks of growth trays, the lift mechanism comprising a first watering head facing a first stack of growth trays and a second watering head facing a second stack of growth trays.

16. The irrigation system according to claim 11, wherein the reservoir is connected to the watering head by a hose.

17. The irrigation system according to claim 11, wherein the reservoir is located remotely from the lift mechanism.

18. The irrigation system according to claim 11, wherein in situ within the vertical growth tower the watering head is separated from the growth trays within a stack of growth trays by a space.

19. The irrigation system according to claim 11, wherein the watering head comprises a pressure valve.

* * * * *